(12) United States Patent
Usui et al.

(10) Patent No.: US 8,092,871 B2
(45) Date of Patent: Jan. 10, 2012

(54) LIQUID CRYSTAL DISPLAY DEVICE

(75) Inventors: Kentaro Usui, Osaka (JP); Seiji Tanuma, Osaka (JP); Kazutaka Hanaoka, Osaka (JP); Kimiaki Nakamura, Osaka (JP)

(73) Assignee: Sharp Kabushiki Kaisha, Osaka-shi, Osaka (JP)

( * ) Notice: Subject to any disclaimer, the term of this patent is extended or adjusted under 35 U.S.C. 154(b) by 0 days.

(21) Appl. No.: 12/738,156

(22) PCT Filed: Oct. 10, 2008

(86) PCT No.: PCT/JP2008/002873
§ 371 (c)(1),
(2), (4) Date: Aug. 12, 2010

(87) PCT Pub. No.: WO2009/050869
PCT Pub. Date: Apr. 23, 2009

(65) Prior Publication Data
US 2010/0302491 A1 Dec. 2, 2010

(30) Foreign Application Priority Data
Oct. 15, 2007 (JP) ................. 2007-267479

(51) Int. Cl.
C09K 19/00 (2006.01)
C09K 19/06 (2006.01)
C09K 19/32 (2006.01)
C09K 19/52 (2006.01)

(52) U.S. Cl. ............. 428/1.1; 428/1.2; 428/1.3; 430/20; 349/123; 349/129; 252/299.01; 252/299.6

(58) Field of Classification Search ............ 428/1.1–1.3; 430/20; 252/299.01, 299.6; 349/123, 129
See application file for complete search history.

(56) References Cited

U.S. PATENT DOCUMENTS

| | | | |
|---|---|---|---|
| 5,309,264 A | 5/1994 | Lien et al. | |
| 6,151,003 A | 11/2000 | Tsuda et al. | |
| 6,661,488 B1 | 12/2003 | Takeda et al. | |
| 6,862,062 B2 | 3/2005 | Kubo et al. | |
| 6,977,704 B2 | 12/2005 | Kataoka | |
| 7,169,449 B2 | 1/2007 | Nakanishi et al. | |
| 7,351,453 B2 | 4/2008 | Ichinose et al. | |
| 2003/0151703 A1 | 8/2003 | Nakanishi et al. | |
| 2005/0280761 A1 | 12/2005 | Ishii | |
| 2006/0055858 A1 | 3/2006 | Nakanishi et al. | |
| 2010/0283952 A1* | 11/2010 | Hashimoto et al. ........... 349/128 |

FOREIGN PATENT DOCUMENTS

| | | |
|---|---|---|
| EP | 0 821 260 A1 | 1/1998 |
| JP | 2000-347174 | 12/2000 |
| JP | 2003-279957 | 10/2003 |
| JP | 2004-302261 | 10/2004 |

OTHER PUBLICATIONS

International Search Report for PCT/JP2008/002873, mailed Nov. 18, 2008.
Supplementary EP Search Report mailed Aug. 31, 2010 in corresponding EP application 08838873.1.
Pauluth et al, "Advanced Liquid Crystals for Television", Journal of Material Chemistry 20040421 Royal Society of Chemistry GB, vol. 14, No. 8, Apr. 21, 2004, pp. 1219-1227.
Reiffenrath et al, "Synthesis and Properties of Liquid Crystaline Materials with High Optical Anisotropy", Proceedings of the International Society for Optical Engineering (SPIE), SPIE, USA LNKD-DOI:10.1117/12.19930, vol. 1257, Jan. 1, 1990, pp. 84-94.
International Search Report for PCT/JP2008/002569, mailed Oct. 21, 2008.

* cited by examiner

*Primary Examiner* — Geraldina Visconti
(74) *Attorney, Agent, or Firm* — Nixon & Vanderhye, P.C.

(57) ABSTRACT

A liquid crystal display device of the present invention includes: a liquid crystal layer containing a nematic liquid crystal material; a pair of electrodes opposing each other via the liquid crystal layer; a pair of alignment films respectively provided between the pair of electrodes and the liquid crystal layer; and an alignment sustaining layer formed of a photopolymerized material on each of surfaces of the pair of alignment films which are closer to the liquid crystal layer, the alignment sustaining layer being configured to regulate a pretilt azimuth of a liquid crystal molecule of the liquid crystal layer during the absence of an applied voltage across the liquid crystal layer, wherein the pretilt azimuth of the liquid crystal molecule of the liquid crystal layer is regulated by the alignment sustaining layer during the absence of an applied voltage across the liquid crystal layer. The nematic liquid crystal material contains a liquid crystal compound having a terphenyl ring system as an indispensable component, and the liquid crystal layer further contains part of a photopolymerizable compound which is a source material of the photopolymerized material, a content of the photopolymerizable compound relative to the nematic liquid crystal material being less than 0.015 mol %.

6 Claims, 5 Drawing Sheets

(a)

(b)

600nm

| | LIQUID CRYSTAL MATERIAL No. | | LC-5 | LC-6 | LC-7 |
|---|---|---|---|---|---|
| | Δε | | -3.1 | -7.0 | -4.1 |
| | LIQUID CRYSTAL COMPOUNDS | | COMPOSITION [mass%] | | |
| NEGATIVE | PHENYL-CYCLOHEXANE | Rm-(H)-(◯)-O-Rn (F F) | 35 | 41 | 23.5 |
| | PHENYL-BICYCLOHEXANE | Rm-(H)-(H)-(◯)-Rn (F F) | | 11 | |
| | | Rm-(H)-(H)-(◯)-O-Rn (F F) | 4 | 27 | 17.5 |
| | BIPHENYL-CYCLOHEXANE | Rm-(H)-(◯)-(◯)-O-Rn (F F) | 16 | 20 | 20 |
| | TERPHENYL | Rm-(◯)-(◯)-(◯)-Rn (F F) | | 1 | 14.5 |
| NEUTRAL | BICYCLOHEXANE | Rm-(H)-(H)-Rn | 11 | | |
| | BICYCLIC ALKENYL | Rm-(H)-(H)-CH=CHRn | 10 | | 23 |
| | TRICYCLIC ALKENYL | CH2=CHRm-(H)-(H)-(◯)-Rn | 24 | | 1.5 |
| | TOTAL | | 100 | 100 | 100 |

*FIG.6*

| LIQUID CRYSTAL MATERIAL No. | | | LC-9 |
|---|---|---|---|
| Δε | | | -3.5 |
| LIQUID CRYSTAL COMPOUNDS | | | COMPOSITION [mass%] |
| NEGATIVE | PHENYL-CYCLOHEXANE | Rm-(H)-(O)-O-Rn, F F | 22 |
| | PHENYL-BICYCLOHEXANE | Rm-(H)-(H)-(O)-Rn, F F | 21 |
| | | Rm-(H)-(H)-(O)-O-Rn, F F | 17 |
| | BIPHENYL-CYCLOHEXANE | Rm-(H)-(O)-(O)-O-Rn, F F | 8 |
| | TERPHENYL | Rm-(O)-(O)-(O)-Rn, F F | |
| NEUTRAL | BICYCLOHEXANE | Rm-(H)-(H)-Rn | 15 |
| | | Rm-(H)-(H)-O-Rn | 8 |
| | PHENYL-CYCLOHEXANE | Rm-(H)-(O)-Rn | 9 |
| TOTAL | | | 100 |

# LIQUID CRYSTAL DISPLAY DEVICE

This application is the U.S. national phase of International Application No. PCT/JP2008/002873, filed 10 Oct. 2008, which designated the U.S. and claims priority to Japanese Patent Application No. 2007-267479, filed 15 Oct. 2007, the entire contents of each of which are hereby incorporated by reference.

TECHNICAL FIELD

The present invention relates to a liquid crystal display device and specifically to a liquid crystal display device which uses the Polymer Sustained Alignment Technology.

BACKGROUND ART

Liquid crystal display devices perform display by utilizing the change of the orientations of liquid crystal molecules which is caused by a voltage applied across the liquid crystal layer. The orientations of the liquid crystal molecules which occur in the absence of an applied voltage across the liquid crystal layer (pretilt directions) are conventionally regulated by alignment films. For example, in TN-mode liquid crystal display devices, the pretilt azimuths of the liquid crystal molecules are regulated by performing a rubbing process on horizontal alignment films. In this specification, the pretilt azimuth refers to a component of a vector that is indicative of the orientation of a liquid crystal molecule in the liquid crystal layer in the absence an applied voltage, the component being in a plane of the liquid crystal layer (in a plane of the substrate). The pretilt angle, which is an angle formed by the alignment film and the liquid crystal molecule, is determined depending primarily on a combination of the alignment film and the liquid crystal material. The pretilt direction is expressed by the pretilt azimuth and the pretilt angle. In TN-mode liquid crystal display devices, the pretilt azimuths regulated by a pair of alignment films which oppose each other via the liquid crystal layer are set perpendicular to each other. The pretilt angle is about 1° to 5°.

In recent years, as a technology for controlling the pretilt directions of the liquid crystal molecules, the Polymer Sustained Alignment Technology (hereinafter, referred to as "PSA technology") has been developed (see Patent Documents 1, 2, and 3). The PSA technology is a technology of controlling the pretilt directions of the liquid crystal molecules by means of a polymer formed in the liquid crystal layer. The polymer is formed by irradiating, after assemblage of a liquid crystal cell, a small amount of polymerizable material (e.g., a photopolymerizable monomer) mixed in a liquid crystal material with active energy rays (e.g., ultraviolet light) while a predetermined voltage is applied across the liquid crystal layer. The orientations of the liquid crystal molecules maintained during the formation of the polymer are sustained (memorized) even after removal of the voltage (in the absence of an applied voltage). Thus, the PSA technology is advantageously capable of adjusting the pretilt azimuths and pretilt angles of the liquid crystal molecules by controlling, for example, an electric field generated in the liquid crystal layer. Also, the PSA technology does not require a rubbing process and is therefore suitable to formation of a vertical alignment type liquid crystal layer that has difficulty in regulating the pretilt directions by means of a rubbing process. The entire disclosures of Patent Documents 1, 2, and 3 are incorporated in this specification by reference.

Patent Document 1: Japanese Laid-Open Patent Publication No. 2002-357830

Patent Document 2: Japanese Laid-Open Patent Publication No. 2003-307720

Patent Document 3: Japanese Laid-Open Patent Publication No. 2006-78968

Patent Document 4: Japanese Laid-Open Patent Publication No. 2006-169518

However, in the PSA technology, an insufficient UV dose leads to a problem that an unreacted portion of a photopolymerizable compound remains in the liquid crystal layer. The remaining photopolymerizable compound gradually reacts due to light or heat from a backlight during use of the liquid crystal display device, so that the orientations of the liquid crystal molecules which occur during the use may be sustained (memorized). If this phenomenon occurs, it may emerge in the form of image sticking. An image sticking phenomenon which is detrimental to general liquid crystal display devices is caused by a DC component remaining in the liquid crystal layer and is therefore called "DC image sticking", while the above-described image sticking phenomenon which particularly occurs in connection with the PSA technology is herein referred to as "polymeric image sticking".

The ultraviolet light can damage the liquid crystal material and the organic materials of the alignment films and other constituents and can therefore decrease the reliability. Thus, the UV dose cannot be inordinately increased. As the duration of the ultraviolet irradiation increases, the tact time accordingly increases. This leads to an increase in production cost.

Patent Document 3 discloses that the amount of a residual monomer is preferably 0.02 mass % or less. However, in example 6 (table 2) which uses a liquid crystal display panel, the amount of the residual monomer cannot be decreased to 0.017 mass % without ultraviolet irradiation of more than 40 J/cm$^2$. Even when the UV dose is increased from 30 J/cm$^2$ to 40 J/cm$^2$ in the second ultraviolet irradiation step, the amount of the residual monomer only decreases from 0.02 mass % to 0.017 mass %. Thus, it is understood that, in consideration of reliability and production cost, the decrease in the amount of the residual monomer by means of increasing the UV dose has a limit.

The technology disclosed herein was conceived in order to solve the above problems. One of the objects of the technology disclosed herein is to provide a liquid crystal display device fabricated using the PSA technology, in which the amount of a polymerizable compound remaining in the liquid crystal layer is sufficiently decreased without increasing the UV dose as compared with the conventional process.

A liquid crystal display device of the technology disclosed herein includes: a liquid crystal layer containing a nematic liquid crystal material; a pair of electrodes opposing each other via the liquid crystal layer; a pair of alignment films respectively provided between the pair of electrodes and the liquid crystal layer; and an alignment sustaining layer formed of a photopolymerized material on each of surfaces of the pair of alignment films which are closer to the liquid crystal layer, the alignment sustaining layer being configured to regulate a pretilt azimuth of a liquid crystal molecule of the liquid crystal layer during the absence of an applied voltage across the liquid crystal layer, wherein the pretilt azimuth of the liquid crystal molecule of the liquid crystal layer is regulated by the alignment sustaining layer during the absence of an applied voltage across the liquid crystal layer, the nematic liquid crystal material contains a liquid crystal compound having a terphenyl ring system as an indispensable component, and the liquid crystal layer further contains part of a photopolymerizable compound which is a source material of the photopolymerized material, a content of the photopolymerizable compound relative to the nematic liquid crystal material being less than 0.015 mol%.

In one embodiment, a content of the liquid crystal compound having the terphenyl ring system in the nematic liquid crystal material is in a range of not less than 1 mol % and not more than 25 mol %.

In one embodiment, the photopolymerizable compound includes a diacrylate monomer which has a liquid crystal skeleton or a dimethacrylate monomer which has a liquid crystal skeleton.

In one embodiment, the pair of alignment sustaining layers include a particle of the photopolymerized material which has a particle diameter of 50 nm or less.

In one embodiment, the pair of alignment films are vertical alignment films, and the nematic liquid crystal material has negative dielectric anisotropy.

In a liquid crystal display device of the technology disclosed herein, a nematic liquid crystal material included in a liquid crystal layer contains a liquid crystal compound having a terphenyl ring system as an indispensable component. The liquid crystal compound having a terphenyl ring system has the function of increasing the efficiency of a polymerization reaction of a photopolymerizable compound in the liquid crystal layer. Therefore, in an end-product liquid crystal display device, the content of the photopolymerizable compound remaining in the liquid crystal layer relative to the nematic liquid crystal material can be less than 0.015 mol %. Further, the UV dose need not to be increased as compared with the conventional process. Thus, the liquid crystal display device of the technology disclosed herein is also advantageous in terms of reliability and production cost.

BRIEF DESCRIPTION OF DRAWINGS

FIG. 6 A table showing liquid crystal compounds which are constituents of nematic liquid crystal material LC-9 used in an experiment, the chemical structure formula, the composition, and the dielectric anisotropy ($\Delta\in$).

Figure 1:
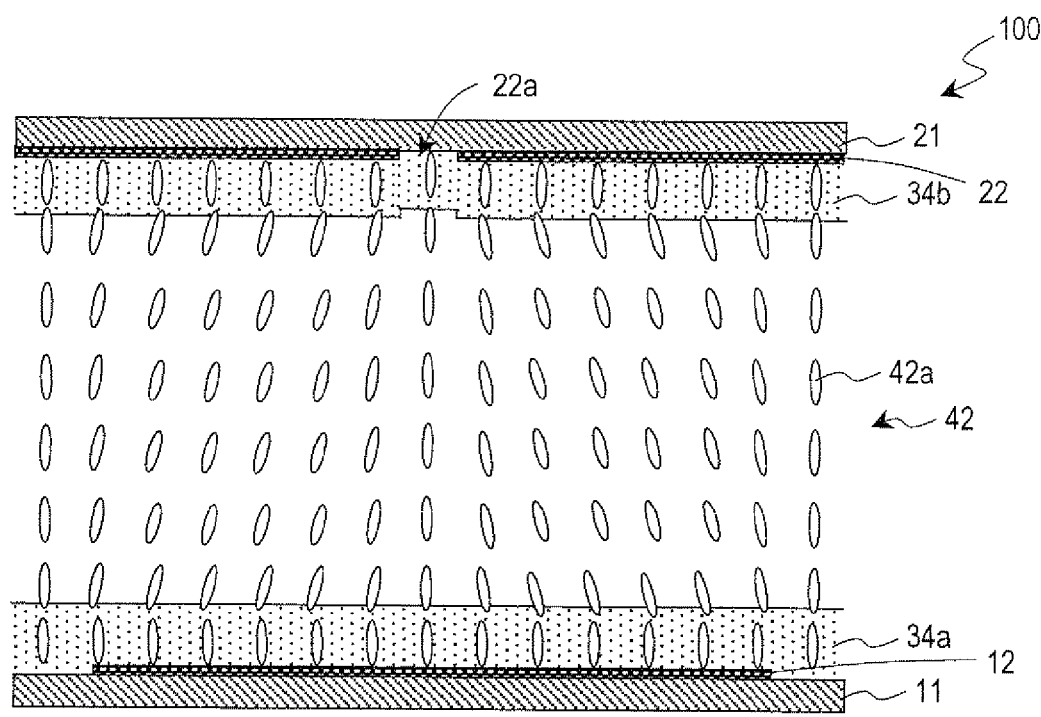
FIG. 1 A cross-sectional view of one pixel of a liquid crystal display device 100. (a) schematically shows an alignment of liquid crystal molecules 42a in a black display state (in the absence of an applied voltage). (b) schematically shows an alignment of liquid crystal molecules 42a in a white display state (in the presence of an applied voltage).
Figure 1:
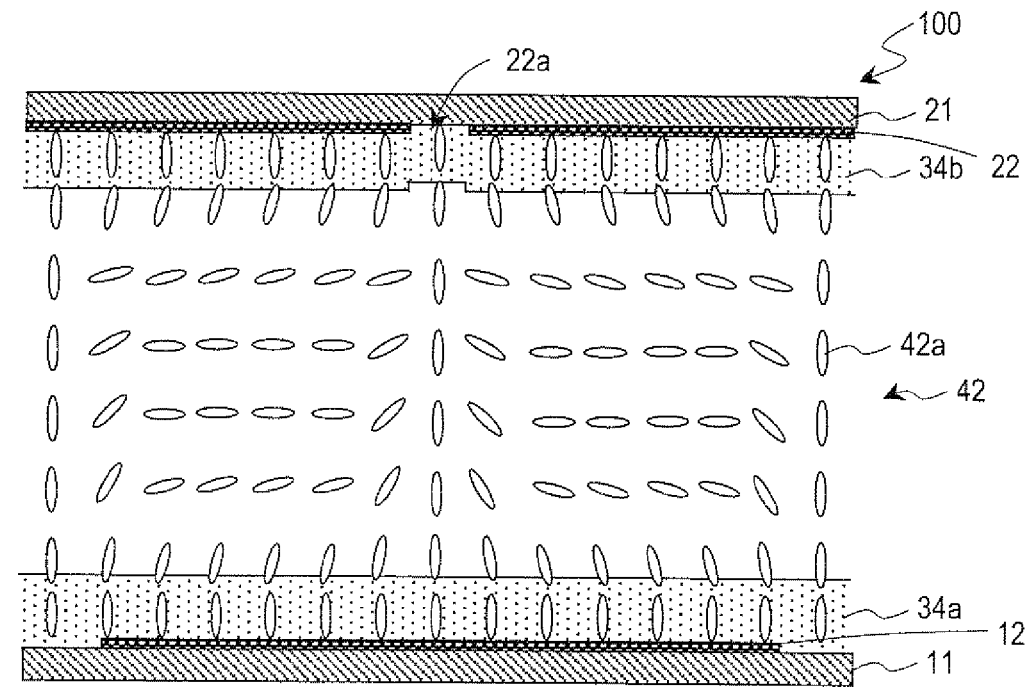

| DESCRIPTION OF THE REFERENCE NUMERALS | |
|---|---|
| 11, 21 | substrate |
| 12 | pixel electrode |
| 22 | counter electrode |
| 22a | opening |
| 34a, 34b | alignment sustaining layer |
| 42 | liquid crystal layer |
| 42a | liquid crystal molecules |
| 100 | liquid crystal display device |

DETAILED DESCRIPTION

Hereinafter, a liquid crystal display device of an embodiment of the technology disclosed herein is described with reference to the drawings. The technology disclosed herein is not limited to the embodiment described below.

[Liquid Crystal Display Device Fabricated Using PSA Technology]

First, a structure and operation of a liquid crystal display device fabricated using the PSA technology are described with reference to FIG. 1 and FIG. 2.

FIG. 1 is a cross-sectional view schematically showing a structure of one pixel of a liquid crystal display device 100 of an embodiment of the technology disclosed herein. FIG. 1(a) shows an alignment of liquid crystal molecules 42a in a black display state (in the absence of an applied voltage). FIG. 1(b) shows an alignment of the liquid crystal molecules 42a in a white display state (in the presence of an applied voltage). Hereinafter, the embodiment of the technology disclosed herein is described with an example of a vertical alignment type liquid crystal display device which performs display in a normally black mode, to which the technology disclosed herein is however not limited.

The liquid crystal display device 100 has a plurality of pixels and includes a pair of substrates 11 and a pair of polarizing plates (not shown) placed in crossed Nicole on the outer sides of the substrates. The liquid crystal display device 100 is configured to display images in a normally black mode. Each pixel has a liquid crystal layer 42 including a nematic liquid crystal material (liquid crystal molecules 42a) whose dielectric anisotropy is negative, and a pixel electrode 12 and a counter electrode 22 which oppose each other via the liquid crystal layer 42. A pair of vertical alignment films (not shown) are respectively provided between the pixel electrode 12 and the liquid crystal layer 42 and between the counter electrode 22 and the liquid crystal layer 42. Surfaces of the alignment films which are closer to the liquid crystal layer 42 are respectively provided with a pair of alignment sustaining layers 34a and 34b formed of a photopolymerized material. The alignment sustaining layers 34a and 34b are formed by, after formation of a liquid crystal cell, polymerizing a photopolymerizable compound contained in a prepared liquid crystal material while a voltage is applied across the liquid crystal layer 42.

Before the polymerization of the photopolymerizable compound, the alignment of the liquid crystal molecules 42a is controlled by the vertical alignment films (not shown) so that the liquid crystal molecules 42a are oriented vertically to the substrate surface. When a white display voltage is applied, the liquid crystal molecules 42a result in an alignment where they are inclined in predetermined directions according to an oblique electric field generated at an edge portion of the pixel electrode 12 and an oblique electric field generated near an opening 22a of the counter electrode 22 as shown in FIG. 1(b).

The alignment sustaining layers 34a and 34b, which are formed under application of the white display voltage, function to sustain (memorize) an alignment of the liquid crystal molecules 42a which occurs under application of the white display voltage across the liquid crystal layer 42 even after removal of the voltage (in the absence of an applied voltage) as shown in FIG. 1(a).

The liquid crystal molecules 42a in the closest vicinity of the vertical alignment films are under the strong anchoring effect and are therefore oriented vertical to the surfaces of the vertical alignment films even in the presence of an applied voltage. Thus, the liquid crystal molecules 42a fixed by the alignment sustaining layers 34a and 34b formed over the vertical alignment films only have a slight tilt (1° to 5°) from the vertical direction (pretilt angle of 85° to 89°) as schematically shown in FIG. 1(a). As seen from the comparison of FIG. 1(a) and FIG. 1(b), the alignment of the liquid crystal molecules 42a fixed by the alignment sustaining layers 34a and 34b scarcely change even when a voltage is applied.

The liquid crystal display device 100 of an embodiment of the technology disclosed herein has the alignment sustaining layers 34a and 34b and therefore exhibits an alignment of the liquid crystal molecules pretilted in predetermined directions as shown in FIG. 1(a) even in the absence of an applied voltage. The alignment which occurs in this condition conforms to the alignment of the liquid crystal molecules 42a which occurs in a white display state (in the presence of an applied voltage) as shown in FIG. 1(b). As a result, a stable alignment can be achieved, and the response characteristics of the liquid crystal molecules, etc., can be improved.

In the example described herein, an opening 22a (portion not including a conductive layer) is provided in the counter electrode 22 in order to control the orientations of the liquid crystal molecules 42a. However, the method for controlling the orientations of the liquid crystal molecules 42a in the formation of the alignment sustaining layers 34a and 34b is not limited to this example. For example, as described in Patent Document 1, by providing a dielectric protrusion or electrode slit as necessary, four liquid crystal domains which have different azimuths of the orientations of the liquid crystal molecules 42a can be formed.

The alignment sustaining layers 34a and 34b can be formed, for example, in a manner described below. Here, a liquid crystal display panel is fabricated according to the same method as that described in Patent Document 3 (example 6).

A liquid crystal display panel for use in the liquid crystal display device 100 is fabricated using a material in which a photopolymerizable compound of not less than 0.1 mass % and not more than 0.5 mass % is mixed in a nematic liquid crystal material of negative dielectric anisotropy. The photopolymerizable compound may preferably be a monomer or oligomer which has a radically-polymerizable functional group, such as an acrylate group, a methacrylate group, a vinyl group, or the like. In terms of reactivity, a monomer or oligomer which has an acrylate group or a methacrylate group is more preferable. Among such examples, a polyfunctional group is preferable. The photopolymerizable compound used herein may be a diacrylate or dimethacrylate monomer which has a liquid crystal skeleton. By using a monomer which has a liquid crystal skeleton, the alignment of the liquid crystal molecules can be sustained more stably. Especially, a ring system or condensed ring system described in Patent Document 2 to which an acrylate group or a methacrylate group is directly bonded is preferable.

The liquid crystal layer of this liquid crystal display panel (including the above-described monomer) is irradiated with UV light (e.g., i-line at the wavelength of 365 nm, about 20 mW) at about 20 J/cm$^2$ while a predetermined voltage is applied across the liquid crystal layer. Application of the voltage across the liquid crystal layer causes the liquid crystal molecules 42a to have a predetermined alignment according to electric fields generated between the counter electrode 22 and the pixel electrode 12. The UV irradiation causes polymerization of the photopolymerizable compound so that a photopolymerized material is produced. The photopolymerized material forms the alignment sustaining layers 34a and 34b on the vertical alignment films for fixing the above alignment of the liquid crystal molecules 42a. A series of steps for photopolymerizing a photopolymerizable compound while a predetermined voltage which is not lower than the white display voltage is applied to form alignment sustaining layers is sometimes referred to as "PSA process".

Figure 2:
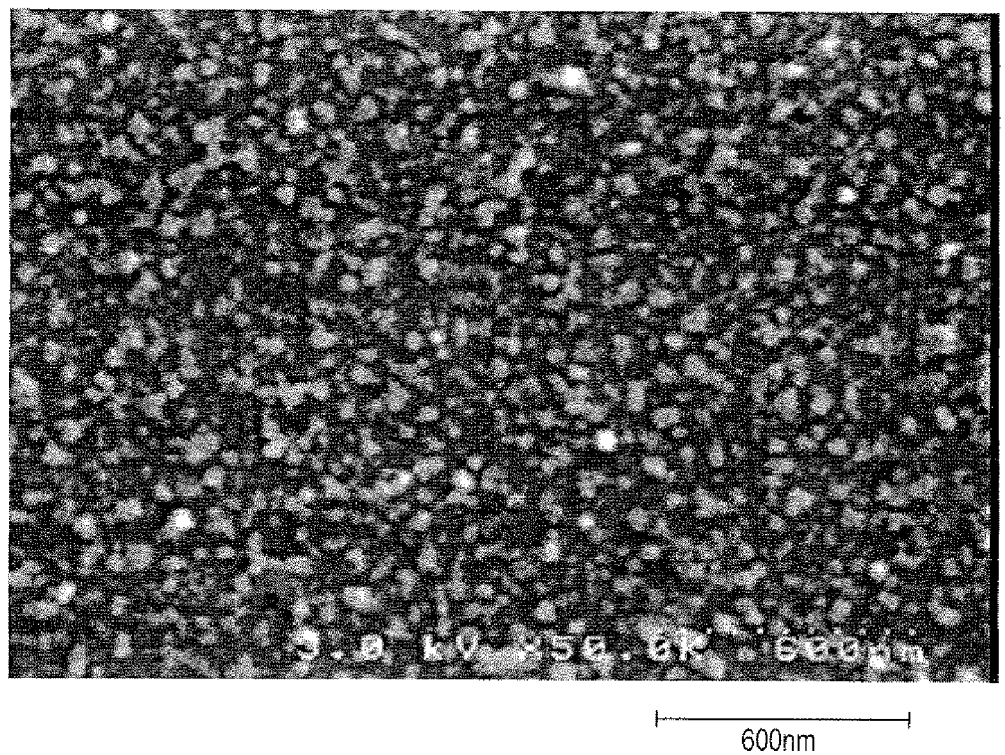
FIG. 2 A SEM image of an alignment sustaining layer included in a liquid crystal display device of an embodiment of the technology disclosed herein.

An example of the alignment sustaining layers 34a and 34b is described as to the structure with reference to FIG. 2. A SEM image shown in FIG. 2 is a result of a SEM observation of a surface of the alignment sustaining layer. Specifically, a sample of a liquid crystal display panel fabricated as described above was disassembled, and thereafter, the liquid crystal material was removed from the disassembled sample. A surface of the alignment sustaining layer of the resultant sample was then washed with a solvent and observed by SEM.

As seen from FIG. 2, the alignment sustaining layer contains particles of the photopolymerized material with the particle size of 50 nm or less. The photopolymerized material may not necessarily cover the entire surfaces of the alignment films. The surfaces of the alignment films may be partially exposed. The liquid crystal molecules aligned according to electric fields generated in the liquid crystal layer are fixed by the photopolymerized material, so that the alignment of the liquid crystal molecules is sustained even in the absence of an electric field. After the formation of the alignment sustaining layers over the vertical alignment films, the alignment sustaining layers regulate the pretilt directions of the liquid crystal molecules.

The presence of the alignment sustaining layers can also be confirmed using a surface analysis method different from SEM, such as AFM, SIMS, or the like.

[Liquid Crystal Compound Having Terphenyl Ring System]

The present inventor found that, when the nematic liquid crystal material contains a liquid crystal compound having a terphenyl ring system (which refers to a para isomer unless otherwise specified), the amount of the residual photopolymerizable compound is reduced, and reached the concept of the technology disclosed herein. Note that the liquid crystal compound having a terphenyl ring system is hereinafter referred to as "terphenyl liquid crystal compound". Hereinafter, the technology disclosed herein is described below in details with experiment examples. Note that Patent Document 4 discloses a nematic liquid crystal material of negative dielectric anisotropy which contains a terphenyl liquid crystal compound as an optional component, but does not in the least disclose or suggest the knowledge described below.

The relationship between the composition of the nematic liquid crystal material and the residual monomer ratio is described with reference to FIG. 3. Liquid crystal material LC-1 used herein is a nematic liquid crystal material whose dielectric anisotropy (Δ∈) is zero. LC-2 to LC-4 are mixtures of LC-1 (primary material) and different types of liquid crystal compounds. Specifically, each of LC-2 to LC-4 contains LC-1 and one type of the liquid crystal compounds in the proportion of 15 mass %. LC-2 is a mixture of LC-1 and a terphenyl liquid crystal compound A. LC-3 is a mixture of LC-1 and terphenyl liquid crystal compound B. LC-4 is a mixture of LC-1 and an alkenyl liquid crystal compound.

In liquid crystal materials LC-1 to LC-4, 0.3 mass % of a dimethacrylate monomer having a liquid crystal skeleton was mixed as the photopolymerizable compound to prepare liquid crystal materials for PSA. Note that a photoinitiator was not used.

The resultant liquid crystal materials for PSA were used to fabricate liquid crystal cells (cell gap: 3.25 μm) which were then irradiated with ultraviolet light (365 nm) of about 23 mW/cm² at about 400 mJ/cm² at 20° C., 30° C., 40° C., and 50° C. Thereafter, each of the liquid crystal cells was disassembled, and a small amount of the liquid crystal material was sampled. The sampled liquid crystal material was diluted with acetone, and the residual monomer was quantified by a gas chromatography/mass spectrometry (GC/MS) method. In the graph shown in FIG. 3, the ordinate axis represents the residual monomer ratio, which is indicative of the ratio of the amount of the residual monomer to the initial monomer amount in percentages. The abscissa axis represents the temperature of the liquid crystal cell during ultraviolet irradiation. Note that the present inventor experimentally confirmed that the same results are obtained even when a diacrylate monomer was used in substitution for the dimethacrylate monomer.

Figure 3:
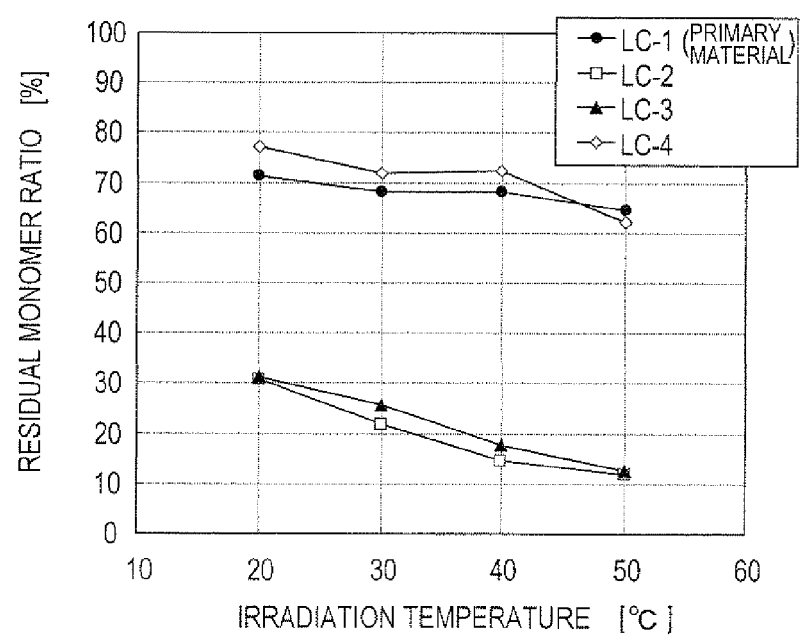
FIG. 3 A graph for illustrating the relationship between the composition of a nematic liquid crystal material and the residual monomer ratio. The ordinate axis represents the residual monomer ratio. The abscissa axis represents the temperature of a liquid crystal cell during ultraviolet irradiation.

As clearly seen from FIG. 3, the residual monomer ratio of LC-4 which contains an alkenyl liquid crystal compound is not largely different from that of LC-1 which is the primary material of LC-4. On the other hand, LC-2 and LC-3, each of which contains a terphenyl liquid crystal compound, have smaller residual monomer ratios than that of LC-1. As clearly understood from this, the terphenyl liquid crystal compound specifically contributes to the reaction of the photopolymerizable compound and produces the effect of decreasing the amount of the residual monomer. This effect is produced at substantially the same degree irrespective of the type of the terphenyl liquid crystal compound (A or B). As understood from FIG. 3, the effect achieved by mixing the terphenyl liquid crystal compound becomes greater as the temperature of ultraviolet irradiation increases.

Next, the result of an examination as to the relationship between the content of the terphenyl liquid crystal compound and the residual monomer ratio is described.

Figures 4, 5:
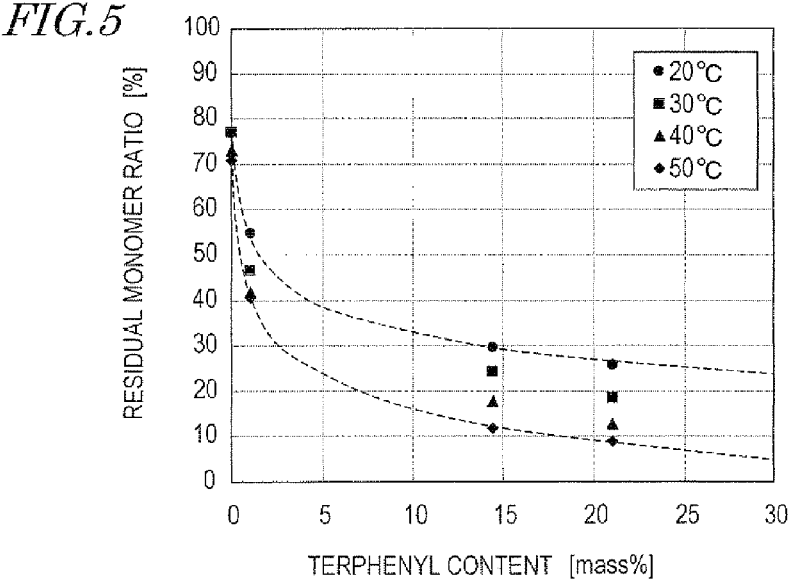
FIG. 4 A table showing liquid crystal compounds which are constituents of nematic liquid crystal materials LC-5, LC-6 and LC-7 used in experiments, the chemical structure formula, the composition, and the dielectric anisotropy ($\Delta\in$).
FIG. 5 A graph showing the relationship between the content of a terphenyl liquid crystal compound and the residual monomer ratio.

FIG. 4 shows liquid crystal compounds which are constituents of the nematic liquid crystal materials used in experiments, the chemical structure formula, the composition, and the dielectric anisotropy (Δ∈). Liquid crystal material LC-5 does not contain a terphenyl liquid crystal compound. Liquid crystal material LC-6 contains 1.0 mass % of terphenyl liquid crystal compound A. Liquid crystal material LC-7 contains 12 mass % of terphenyl liquid crystal compound A and 2.5 mass % of terphenyl liquid crystal compound B.

In four types of liquid crystal materials, LC-5 to LC-7 shown in FIG. 4 and liquid crystal material LC-8 which contains 21.0 mass % of terphenyl liquid crystal compound C, 0.3 mass % of a dimethacrylate monomer having a liquid crystal skeleton was mixed as the photopolymerizable compound to prepare liquid crystal materials for PSA. A photoinitiator was not used. The resultant liquid crystal materials for PSA were used to fabricate liquid crystal cells which were then irradiated with ultraviolet light (365 nm) of about 23 mW/cm² at about 400 mJ/cm² at 20° C., 30° C., 40° C., and 50° C. Thereafter, each of the liquid crystal cells was disassembled, and a small amount of the liquid crystal material was sampled. The sampled liquid crystal material was diluted with acetone, and the residual monomer was quantified by a GC/MS method. In the graph shown in FIG. 5, the ordinate axis represents the residual monomer ratio, which is indicative of the ratio of the amount of the residual monomer to the initial monomer amount in percentages. The abscissa axis represents the content of the terphenyl liquid crystal compound. Note that the present inventor experimentally confirmed that the same results are obtained even when a diacrylate monomer was used in substitution for the dimethacrylate monomer.

As clearly seen from FIG. 5, the residual monomer ratio decreases as the content of the terphenyl liquid crystal compound increases. It is also understood that only 1.0 mass % of the terphenyl liquid crystal compound contained in the material produces the effect of decreasing the amount of the residual monomer. It is also understood from FIG. 5 that the effect produced by mixing the terphenyl liquid crystal compound in the material increases as the temperature of ultraviolet irradiation increases. Further, LC-7 of FIG. 5 (terphenyl liquid crystal compound A: 12 mass %, terphenyl liquid crystal compound B: 2.5 mass %) and LC-2 (terphenyl liquid crystal compound A: 15.0 mass %) and LC-3 (terphenyl liquid crystal compound B: 15.0 mass %) of FIG. 3 result in approximately equal residual monomer ratios. Thus, it is understood that the residual monomer ratio does not depend on the type of the liquid crystal compound other than the terphenyl liquid crystal compound.

Next, the result of an examination as to the relationship between the amount of the residual monomer and polymeric image sticking is described. The liquid crystal materials used herein are LC-6 which contains 1.0 mass % of a terphenyl liquid crystal compound (terphenyl liquid crystal compound A), and LC-9 which does not contain a terphenyl liquid crystal compound. FIG. 6 shows liquid crystal compounds which are constituents of LC-9, the chemical structure formula, the composition, and the dielectric anisotropy (Δ∈).

The mean molecular weights of the nematic liquid crystal material examples used herein are substantially equal to the molecular weight of the monomer, and therefore, the values in mass % can be converted to values in mol % without changing the numerical figures. The values are sometimes shown in mol % because the number of monomers remaining in the liquid crystal material is recognized as a significant factor behind the influences on the polymeric image sticking and the voltage holding ratio.

First, 0.3 mass % of a dimethacrylate monomer having a liquid crystal skeleton is mixed in LC-6 to prepare a liquid crystal material for PSA. A photoinitiator was not used. The resultant liquid crystal material for PSA was used to fabricate a TFT-based liquid crystal display panel. The vertical alignment films used were JALS-204 manufactured by JSR Corporation.

The TFT-based liquid crystal display panel was irradiated with ultraviolet light (365 nm, about 23 mW/cm²) at about 35 J/cm² in the absence of an applied voltage across the liquid crystal layer (the liquid crystal material for PSA). The temperature of the liquid crystal display panel during ultraviolet irradiation was 30° C. The resultant liquid, crystal display panel was disassembled, and the residual monomer was quantified by a GC/MS method in the same way as described above. The results are shown in TABLE 1. The amount of the residual monomer is shown in mass % (=mol %) relative to the nematic liquid crystal material. The presence or absence of application of a voltage for alignment of the liquid crystal molecules does not affect the amount of the residual monomer.

TABLE 1

|      | Terphenyl Content (mass %) | Residual Monomer Amount (mass % or mol %) |
|------|---|---|
| LC-6 | 1.0 | 0.010 |
| LC-9 | 0   | 0.022 |

As clearly seen from the results shown in TABLE 1, with addition of only 1.0 mass % of a terphenyl liquid crystal compound, the amount of the residual monomer which remains in the TFT-based liquid crystal display panel after ultraviolet irradiation at about 35 J/cm² can be reduced to 0.010 mass % (=0.010 mol %).

A fabricated liquid crystal cell was subjected to an aging treatment. The aging treatment was carried out by activating the liquid crystal cell placed in a thermostat chamber at 60° C. to display a black and white checker pattern over a backlight for a continuous period of 240 hours. After this aging treatment, the liquid crystal cell was kept at rest in the thermostat chamber at 60° C. for 240 hours in the absence of an applied voltage across the liquid crystal layer so that the electric charge was totally removed away. Thereafter, the presence or absence of polymeric image sticking was evaluated by checking the presence or absence of image sticking of the checker pattern by naked eye observation in a dark room environment in a state of display where the display across the entire display surface was at a specific intermediate gray scale level (solid display state). The state of display did not change even when the potential of the counter electrode was changed. With this evidence, it was confirmed as not being DC image sticking.

The results of this evaluation showed that no polymeric image sticking was found in the liquid crystal display panel fabricated using LC-6, whereas a polymeric image sticking was found in the liquid crystal display panel fabricated using LC-9.

Next, to determine the amount of the residual monomer which constitutes a threshold of polymeric image sticking based on the results shown in TABLE 1, LC-7 was used to fabricate samples of a TFT-based liquid crystal display panel with different dosages of ultraviolet light (365 nm, about 23 mW/cm²), such that the samples contain different amounts of the residual monomer. The temperature of the liquid crystal display panel during ultraviolet irradiation was 30° C. The vertical alignment films used were JALS-204 manufactured by JSR Corporation. The TFT-based liquid crystal display panel used had the pixel numerical aperture of 54% and included an interlayer dielectric film between the pixel electrode and the bus line whose ultraviolet transmittance was about 80%. A plurality of samples were prepared for each condition. Some of the samples were used for the quantification of the amount of the residual monomer. The remaining samples were used for the evaluation of polymeric image sticking. The results are shown in TABLE 2.

TABLE 2

|  | Sample No. | | | |
|---|---|---|---|---|
|  | A | B | C | D |
| Residual Monomer Amount (mass % or mol %) | 0.048 | 0.022 | 0.014 | 0.012 |
| Polymeric Image Sticking | X | X | ○ | ○ |

It is understood from the results shown in TABLE 2 that, to prevent occurrence of polymeric image sticking, the amount of the residual monomer need to be smaller than 0.015 mass % (=mol %). Also, as previously described, when using LC-9 which does not contain a terphenyl liquid crystal compound, the amount of the residual monomer can only be reduced to 0.022 mass % even with ultraviolet irradiation of 35 J/cm². Therefore, it is understood that a large effect is produced by adding a terphenyl liquid crystal compound to the nematic liquid crystal material.

As described in the examples presented herein, when 0.3 mass % of the photopolymerizable compound is mixed in the nematic liquid crystal material, the content of the terphenyl liquid crystal compound is preferably 1 mass % or more. However, when the content of the photopolymerizable compound is less than 0.3 mass %, the desired effects are produced even if the content of the terphenyl liquid crystal compound is less than 1 mass %. The content of the photopolymerizable compound which is mixed in the nematic liquid crystal material is preferably not less than 0.10 mass % and not more than 0.50 mass % relative to the nematic liquid crystal material. If less than 0.10 mass %, the effect of sustaining the alignment of the liquid crystal molecules may not be sufficiently produced. If more than 0.50 mass %, the amount of the residual monomer may not be sufficiently reduced.

The upper limit of the content of the terphenyl liquid crystal compound mixed in the nematic liquid crystal material is not limited to a specific value. However, in terms of the voltage holding ratio (VHR), it is preferably not more than 35 mass % and is more preferably 25 mass % or less.

The nematic liquid crystal materials which contain the terphenyl liquid crystal compound in different proportions, 14.5 mass % (LC-7), 25.0 mass %, 35.0 mass %, and 44.0 mass %, were used to fabricate liquid crystal cells (cell gap: 3.25 μm). A photopolymerizable monomer was not added. The voltage holding ratio immediately after the fabrication of the liquid crystal cells and the voltage holding ratio after the irradiation with ultraviolet light (365 nm) at 24 J/cm² were measured. The measurement of the voltage holding ratio was carried out by applying a rectangular wave with the amplitude voltage of ±5 V and the frequency of 30 Hz to the liquid crystal cells kept at rest in the thermostat chamber at 70° C. The duration of the voltage application was 60 microseconds. The integral value of the holding voltage for the period of 16.7 milliseconds from the start of the voltage application, which is represented in percentages relative to that achieved under the condition where the holding voltage was 5 V, is referred to as the voltage holding ratio. The initial values of the voltage holding ratio and the values of the voltage holding ratio which were obtained after the ultraviolet irradiation are shown in FIG. 7.

Figure 7:
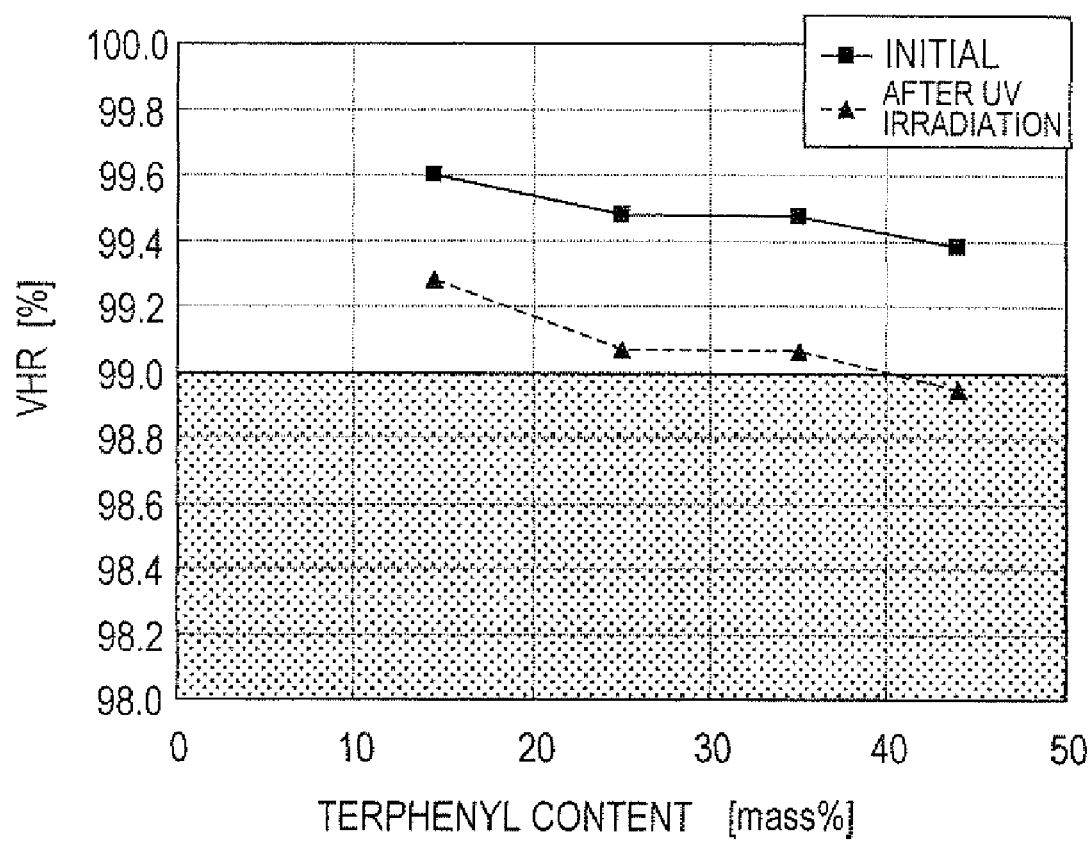
FIG. 7 A graph showing the relationship between the content of a terphenyl liquid crystal compound and the voltage holding ratio (the initial values and the values reached after ultraviolet irradiation).

As understood from FIG. 7, the voltage holding ratio decreases as the content of the terphenyl liquid crystal compound increases. To secure the reliability in an actual use environment, the required voltage holding ratio is 99.0% or higher. In view of the results shown in FIG. 7, the content of the terphenyl liquid crystal compound is preferably not more than 35 mass % and is more preferably 25 mass % or less.

As described above, the terphenyl liquid crystal compound contained in the nematic liquid crystal material produces the effect of specifically increasing the efficiency (reaction velocity) of a photopolymerization reaction (radical reaction). As a result, in an end-product liquid crystal display device, the content of the photopolymerizable compound remaining in the liquid crystal layer relative to the nematic liquid crystal material is less than 0.015 mol %. Further, the UV dose need not to be increased, but rather can be decreased, as compared with the conventional process. Thus, there are advantages in terms of reliability and production cost.

INDUSTRIAL APPLICABILITY

The technology disclosed herein is preferably used in liquid crystal display devices for use in mobile phones, television sets, video game systems, various types of monitors, etc.

The invention claimed is:

1. A liquid crystal display device, comprising:
a liquid crystal layer comprising a nematic liquid crystal material;
a pair of electrodes opposing each other via the liquid crystal layer;
a pair of alignment films respectively provided between the pair of electrodes and the liquid crystal layer; and
an alignment sustaining layer formed of a photopolymerized material on each of surfaces of the pair of alignment films which are closer to the liquid crystal layer, the alignment sustaining layer being configured to regulate a pretilt azimuth of a liquid crystal molecule of the liquid crystal layer during the absence of an applied voltage across the liquid crystal layer,
wherein the pretilt azimuth of the liquid crystal molecule of the liquid crystal layer is regulated by the alignment sustaining layer during the absence of an applied voltage across the liquid crystal layer,
the nematic liquid crystal material comprises a liquid crystal compound having a terphenyl ring system as an indispensable component, and
the liquid crystal layer further comprises part of a photopolymerizable compound which is a source material of the photopolymerized material, a content of the photopolymerizable compound relative to the nematic liquid crystal material being less than 0.015 mol %.

2. The liquid crystal display device of claim 1, wherein a content of the liquid crystal compound having the terphenyl ring system in the nematic liquid crystal material is in a range of not less than 1 mol % and not more than 25 mol %.

3. The liquid crystal display device of claim 1, wherein the photopolymerizable compound includes a diacrylate monomer which has a liquid crystal skeleton or a dimethacrylate monomer which has a liquid crystal skeleton.

4. The liquid crystal display device of claim 1, wherein the pair of alignment sustaining layers include a particle of the photopolymerized material which has a particle diameter of 50 nm or less.

5. The liquid crystal display device of claim 1, wherein the pair of alignment films comprise vertical alignment films, and the nematic liquid crystal material has negative dielectric anisotropy.

6. The liquid crystal display device of claim 1, wherein the part of a photopolymerizable compound which comprises the liquid crystal layer is an unreacted portion of the photopolymerizable compound.

* * * * *

UNITED STATES PATENT AND TRADEMARK OFFICE
CERTIFICATE OF CORRECTION

PATENT NO. : 8,092,871 B2
APPLICATION NO. : 12/738156
DATED : January 10, 2012
INVENTOR(S) : Usui et al.

It is certified that error appears in the above-identified patent and that said Letters Patent is hereby corrected as shown below:

On the cover page, please correct the Assignee (73) to read as follows:

(73) Assignee: SHARP KABUSHIKI KAISHA, Osaka-shi, Osaka (JP)
MERCK PATENT GMBH, Darmstadt (DE)

Signed and Sealed this
Seventh Day of August, 2012

David J. Kappos
*Director of the United States Patent and Trademark Office*